United States Patent [19]

Matsuoka et al.

[11] Patent Number: 5,065,833

[45] Date of Patent: Nov. 19, 1991

[54] GROUND-SURFACE-EFFECT WING PLANE

[75] Inventors: Toshio Matsuoka; Akio Higashida; Tokuki Satake, all of Kobe, Japan

[73] Assignee: Mitsubishi Jukogyo Kabushiki Kaisha, Tokyo, Japan

[21] Appl. No.: 556,253

[22] Filed: Jul. 19, 1990

[30] Foreign Application Priority Data

Jul. 31, 1989 [JP] Japan ................................ 1-196507
Jan. 31, 1990 [JP] Japan .................................. 2-21206

[51] Int. Cl.$^5$ .............................................. B60V 1/08
[52] U.S. Cl. .................................. 180/117; 180/119; 244/12.1; 244/105
[58] Field of Search .................... 180/116-119; 244/12.1, 105, 51

[56] References Cited

U.S. PATENT DOCUMENTS

| 2,214,945 | 9/1940 | Weihmiller | 244/105 |
|---|---|---|---|
| 3,208,421 | 9/1965 | Landes et al. | 244/105 |
| 3,627,235 | 12/1971 | Lippisch | 244/12.1 |
| 4,709,879 | 12/1987 | Stafford | 244/12.1 |

FOREIGN PATENT DOCUMENTS

| 0289849 | 2/1967 | Australia . | |
| 0413981 | 5/1968 | Australia . | |
| 0406242 | 5/1969 | Australia . | |
| 0295652 | 12/1988 | European Pat. Off. | 180/116 |
| 2606405 | 8/1977 | Fed. Rep. of Germany . | |
| 2547945 | 2/1978 | Fed. Rep. of Germany . | |
| 2205952 | 4/1981 | Fed. Rep. of Germany . | |
| 3522146 | 2/1986 | Fed. Rep. of Germany . | |
| 0271035 | 11/1933 | France | 244/105 |

Primary Examiner—Charles A. Marmor
Assistant Examiner—Paul Dickson
Attorney, Agent, or Firm—Wenderoth, Lind & Ponack

[57] ABSTRACT

An improved ground-surface-effect winged craft has a main body in the shape of an airfoil, side plates extending nearly vertically at the opposite lateral sides of the main body for intercepting air flowing outwards from the underside of the main body, side plate floats provided at the side plates, a float provided at a central lower portion of the main body, an operator's seat provided on the float, vertical and horizontal tails provided at a rear portion of the main body, and a propelling device for lifting and propelling the airframe of the craft by making use of both a power augment ramwing effect with the horizontal tail and a ground-surface-effect generated between the main body and a flat surface such as a water surface or a ground surface.

7 Claims, 2 Drawing Sheets

GROUND-SURFACE-EFFECT WING PLANE

BACKGROUND OF THE INVENTION

1. Field of the Invention

The present invention relates to a winged craft using a ground-surface-effect so as to exhibit a capability intermediate that of a ship and an airplane so as to be capable of gliding above a water surface or a ground surface.

2. Description of the Prior Art

A ground-surface-effect winged craft representative of those in the prior art is illustrated in FIG. 4.

The ground-surface-effect winged craft is designed, as is generally known, such that it can fly closely to the water or the ground by bringing about a condition in which pressure of an airflow along the lower surface of a wing is produced by the ground-surface-effect caused when the craft approaches the surface of the ground or water to thereby generate lift.

As shown in FIG. 4, the ground-surface-effect winged craft in the prior art has a configuration similar to an airplane, in which a main body 51 is formed as a fuselage, a wing 52 is formed as a main wing, and the plane has conventional horizontal 55 and vertical 56 tails.

In order to enhance the ground-surface-effect, for a given main body 51, a Lippisch wing is employed as the wing 52, and at the ends of the wing are equipped floats 53 and V-shaped direction-stabilizer planes 54, the area of the wing being larger than that of the conventional airplane.

Consequently, in contrast to the fact that an air speed is said to be generally about 100 km/hr in the case of a light plane such as Cessna plane, it is reduced to 50-60 km/hr in the case of the subject winged craft.

However, the above-described ground-surface-effect winged craft in the prior art gives rise to the following problems to be resolved.

That is, the above-mentioned type of ground-surface-effect winged craft in the prior art has disadvantages in that it is hard to turn because upon banking the float 53 comes into contact with the water and in that its lateral stability is poor.

Furthermore, regarding the ground-surface-effect per se produced by the winged craft, the clearance between the wing and the ground is about 1/10×chord length (wing span), and if the left and right wings are subjected to waves in an irregular manner when the plane glides, for instance, above the water surface, then the possibility of the balance of the craft being broken is very high.

Especially, there is a problem in that a water wave drag, a water wave impact or the like upon the floats 53 provided at the opposite ends of the wing 52 may influence take-off from the water surface and alighting on the water surface.

SUMMARY OF THE INVENTION

It is therefore one object of the present invention to provide a ground-surface-effect winged craft which is easy to turn and glides stably, and which can achieve ram wing gliding more safely and more quickly than the ground-surface-effect winged crafts in the prior art.

According to one feature of the present invention, there is provided a ground-surface-effect winged craft comprising a main body having the shape of an airfoil, side plates extending nearly vertically at the opposite lateral sides of the main body for intercepting air flowing outwards from the underside of the main body, side plate floats provided at the side plates, a float provided at a central lower portion of the main body, an operator's seat provided on the float, vertical and horizontal tails provided at a rear portion of the main body, and propelling means for lifting and propelling an airframe by making use of a ground-surface-effect generated between the main body and a flat surface such as a water surface or a ground surface.

According to the present invention, owing to the above-described structural features, the following advantages are obtained.

The air under the airfoil-shaped main body forms two airstreams separated laterally by the float at the center of the main body. Therefore, when banking, e.g. rightward turning of the airframe after take-off, the starboard side of the main body approaches the water surface but the port side is lifted high from the water surface. Since the ground-surface-effect is produced to a degree depending upon the height of the main body from the water surface, a larger lift is exerted upon the starboard side than the port side. Hence the effect creates a restoring force, and therefore, there occurs turning under a laterally sliding condition whereby the possibility of the side plate coming into contact with the water surface is mitigated. With regard to the effect upon turning leftward, a similar but symmetrically opposite phenomena would occur. With respect to lateral stabilization, in response to the descent of the right side (ascent of the left side) a restoring force acts upon the starboard side due to the ground-surface-effect, the attitude of the main body is corrected in a direction of horizontal stabilization whereby the main body tends to return to a horizontal orientation. In response to the descent of the left side, a similar but symmetrically opposite phenomena would occur.

In addition, because the side plate floats are mounted to the side plates, they do not act to generate an underwater drag under a static condition because the side plate floats are not submerged under the water surface. In response to rolling, since the side plate float on the starboard side is submerged in the water in correspondence with the rolling angle (tilting angle) when the main body tilts to the starboard side, the displaced volume of water establishes a buoyancy imparted to the float, thus raising the starboard side of the main body and correcting the tilting angle. The height of the side plates is determined so as to supplement a lift coefficient upon take-off from the water surface.

The fact that under a normal condition the floats of the side plates are not submerged in the water is effective for reducing an underwater drag. In addition, in response to a laterally irregular alighting on the water, since buoyancy is generated in correspondence with a submerged volume of the side plate float, a restoring force is produced, and the airframe tends to be restored to a horizontally stable orientation.

It is to be noted that the main body generally has the shape of an airfoil. If it is propelled by the propelling means, the plane is lifted and propelled by a lift generated due to the airfoil shape and an aerodynamic force of air trapped under the main body by the side plates and the configuration of the main body.

The above-mentioned and other objects, features and advantages of the present invention will become more apparent by referring to the following description of one preferred embodiment of the invention taken in conjunction with the accompanying drawings.

DETAILED DESCRIPTION OF THE PREFERRED EMBODIMENT

Figure 1:
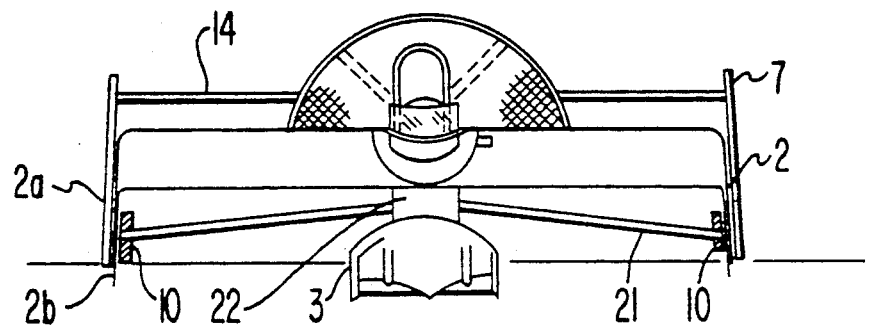
FIGS. 1 through 3 illustrate a ground-surface-effect winged craft according to one preferred embodiment of the present invention, FIG. 1 being a schematic front view thereof, FIG. 2 being a schematic side view thereof, and FIG. 3 being a schematic plan view thereof.
Figure 2:
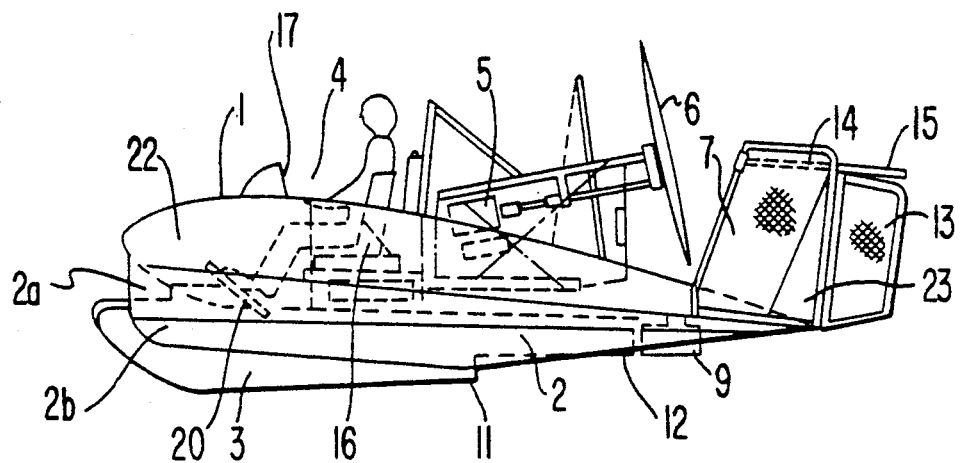
Figure 3:
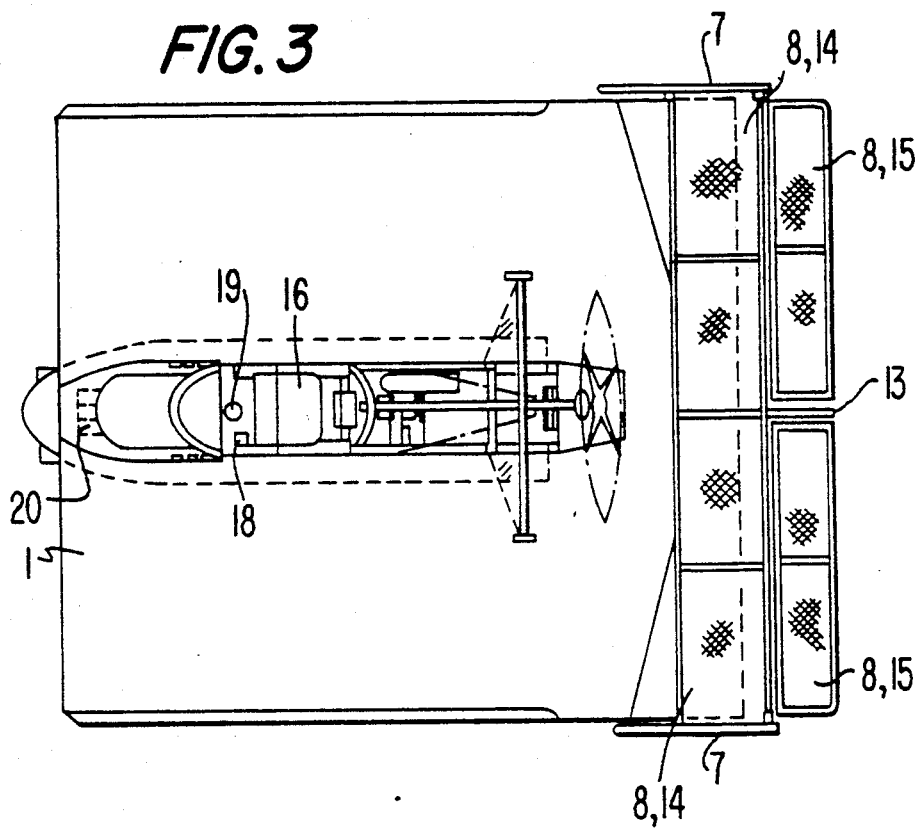
Figure 4:
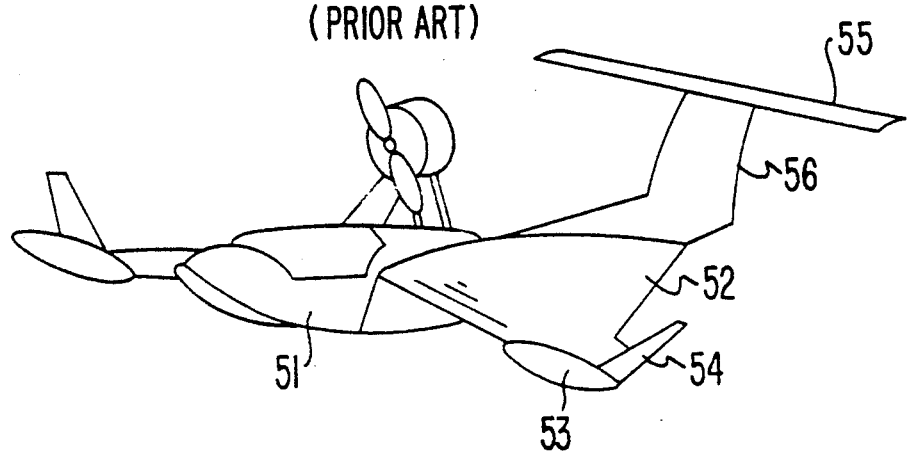
FIG. 4 is a perspective view of a ground-surface-effect winged craft in the prior art.

Now one preferred embodiment of the present invention will be described with reference to FIGS. 1 to 3.

At first, generally describing the overall construction, in these figures, reference numeral 1 designates a main body generally formed in the shape of an airfoil, which constitutes a main wing. This main body 1 is equipped with a cockpit 4 at a central portion, a float 3 at the bottom of the airframe, side plates 2 at its opposite sides for preventing air under the main body 1 from escaping outwards, a propelling engine 5, a propeller 6, and a vertical tail 7 and a horizontal tail 8 at a rear portion.

Next, details of the preferred embodiment will be described.

The main body has the shape of a unitary airfoil adapted to generate a lift for take-off, and its shape and area are determined on the basis of the determined take-off speed, weight of the plane and a lift coefficient. As a principal material of the portion forming the airfoil-shaped portion of the main body 1, carbon FRP that is light-weight and subjected to waterproofing is molded into an integral shape (a monocoque shape).

The side plates 2 hang from the opposite sides of the main wing, forming the main body 1, to the water surface or the ground surface. The side plates are molded of the same material as the main body 1 so as to be integral with the main body 1. These end plates 2 are provided in order that upon navigation, air flowing from in front of the main body 1 to the underside of the main wing will not be allowed to escape sideways, whereby the air will flow out from the rear of the main wing. The lower surfaces (lower edges) of the side plates 2 are flush with (or positioned a little above) a plane connecting an edge of a front step 11 as will be described later and an edge of a rear step 12 as will be described later, to make use of the ground-surface-effect to a maximum extent. Also, the lower surfaces of the side plates 2 do not protrude beyond the aforementioned plane so as not to increase an underwater drag. It is to be noted that each side plate 2 is constructed of a thick plate portion 2a and a thin plate portion 2b.

The float 3 provided at the bottom of the main body 1 is capable of generating a buoyancy compatible to a total weight of the main body 1. It is preferable to design the float 3 so that its total volume may generate a buoyancy about three times as large as the total weight of the main body 1. The front portion of the float 3 is formed in the shape of a chine similar to a bow of normal ships, and the bottom surface is formed in such a shape that an underwater drag such as a frictional resistance, a wave making resistance or the like may be minimized. Upon alighting on the water surface after take-off, the front step 11 and the rear step 12 formed on the float 3 separately come into contact with the water, whereby the impact against the water surface can be mitigated. The material of the float 3 is foamed styrol having its surface reinforced by carbon FRP in order to achieve a lightweight construction. In addition, the float 3 could be formed integrally with a cabin 22.

The cockpit 4 at a central portion of the main body 1 is provided either by forming the cabin 22 integrally with the main body 1, or by forming the cabin 22 with the main body 1 and the float 3. The cockpit 4 consists of a seat 16 for accommodating an operator, and a meter panel 17 including an engine start/stop switch, an engine tachometer, an atmospheric speed meter, a water temperature meter, and the like. Further, an engine throttle lever 18, an elevator control stick 19, a pedal 20 for controlling a rudder and an underwater rudder and the like are provided.

The propelling engine 5 is mounted to a rear portion of the main body 1. This propelling engine 5 is mounted to the main body 1 via an engine frame and it serves as a power source for propelling the main body 1. It drives a propeller 6 via a pulley by means of a driving shaft (not shown). This propelling engine 5 is installed in an upsidedown attitude in order to establish a low center of gravity of the airframe.

The propeller 6 is driven by the propelling engine 5 via a pulley, and generates thrust. The propeller 6 is a variable-pitch propeller having four blades. The propeller pitch is adjusted so as to match the engine power. Reaction torque generated by the propeller 6 is compensated for by providing a difference in the areas of the left and right parts of an elevator 15 of the horizontal tail 8 disposed at a rear portion of the main body 1, or by offsetting the angle of attack to achieve balancing. Compensation by means of a balance weight is not favorable because it is accompanied by an increase in total weight.

The vertical tail 7 provided at a rear portion of the main body 1 consists of fixed portions and a movable portion. The fixed portions are provided on each of the opposite sides of the rear portion of the main body 1, respectively. The movable portion is provided at the center of the rear portion of the main body 1 and forms a rudder 13. The fixed portions of the vertical tail 7 serve to offer stability in allowing the plane to travel straight. And, in order to reduce resistance upon turning, a cut-away portion 23 is provided, to appropriately establish the area of the fixed portions, by cutting away at least $\frac{1}{4}-\frac{1}{3}$ of the vertical tail frame of each of the fixed portions. The remainder of the fixed portions is constituted by cloth or a plate of material such as polyester to form a vertical tail area of the fixed portions. Specifically, cloth such as polyester fibers are woven on a framework of aluminum pipes, so as to form a lightweight structure. If the cut-away portion 23 is $\frac{1}{4}$ less, the plane would be largely influenced by side winds and resistance upon turning would become large. Also, if the cut-away portion 23 is $\frac{1}{3}$ or more, then the ability of the plane to travel straight would become unstable. The rudder 13 is linked to an underwater rudder 9 and serves as a steering member.

The horizontal tail 8 provided at a rear portion of the main body 1 comprises a stabilizer 14 and an elevator 15. The horizontal tail 8 is constructed of materials and by a method similar to that of the vertical tail 7. The stabilizer 14 is of a semi-fixed type, and has such a structure that an angle of attack offered thereby can be preset. Longitudinal stabilization of the airframe is effected by presetting the angle of attack of this stabilizer 14 and by manipulating the elevator 15. For instance, the angle of attack of the stabilizer 14 is semi-fixed at an angle plus or minus 10-15 degrees based on the height of the center of the propeller 6, and the adjustable angle is within a minimum range of 1.5-3.0 degrees. That is, an attack angle adjusting rule having 10-20 holes is provided on a fixed vertical portion of the frame of the vertical tail 7. The structure of the elevator 15 is such that its attack angle can be adjusted plus or minus 15-20 degrees. In this way, the attack angles of the stabilizer 14 and the elevator 15 are individually adjustable.

The above-described attack angles are preferably angles obtained as a result of experiments. If the attack angles are too large, during navigation the craft would be subjected to abrupt variations, and the nose would disfavorably rise and fall to a large extent. However, if the attack angles are too small, variation of the craft is gradual, and so, control of the plane body would be difficult and a run-up distance would be long.

The underwater rudder 9 provided at the rear side of the float 3 is mounted to the bottom of the main body 1. The underwater rudder 9 is linked to the rudder 13 via a push-pull wire so as to be operated by a rudder and underwater rudder control pedal 20 at the operator's seat 4. The underwater rudder 9 is adjustable to assume various vertical positions along a support rod in correspondence with a trim angle of the main body 1. A submerged depth of the underwater rudder 9, when the plane is stationary on the water, is adjusted so that an underwater drag upon take-off from the water may be minimized and the underwater rudder 9 will not come into contact with the water during flying. The underwater rudder 9 is of aluminum.

Reference numeral 10 designates side plate floats mounted to the side plates 2. The side plate floats 10 are provided for the purpose of enhancing both the longitudinal and lateral stability of the main body 1. In other words, a buoyancy is generated according to a submerged volume of the side plate floats 10. This buoyancy serves as a restoring force, and it tends to restore the main body 1 to an original stable state. When the craft turns to the right on the water surface, the main body 1 tilts to the starboard side. Hence, the side plate 10 on the starboard side will submerge in the water, a buoyancy will be generated in correspondence with the submerged volume, and a restoring force will therefore act to restore the craft to its original upright state. This results in an enhancement of lateral stability. With respect to longitudinal stability, a similar effect is also obtained. The material of the side plate float 10 is similar to that of the float 3. The height of the position at which the side plate float 10 is mounted to the side plate 2 is higher than a still waterline, and it is preferably about 10-20 mm above the draft line. Therefore, an underwater drag caused by the side plate float 10 during navigation on the water surface is relatively small.

The front step 11 is provided at a central portion of the bottom surface of the float 3. This facilitates a cutting of water from when the main body 1 is initially in contact with the water to when the main body 1 has taken off from the water, and thereby reduces an underwater drag. The front step 11 is designed so as to support a center of gravity of the main body, and the cutting depth of the front step 11 is preferably 10% or less of the width of the float 3. For instance, if the width of the float 3 is 800 mm, then the cutting depth of the step is preferably 80 mm or less.

Reference numeral 12 designates a rear end portion of the bottom surface of the float 3, that is, a rear step. A plane connecting the edge of the front step 11 and the edge of the rear step 12 coincides with the water surface when the craft floats thereon, and an angle formed between a reference plane of the main wing of the main body 1 and said plane connecting the edges of the steps 11, 12 constitutes the angle of attack of the main body 1 upon take-off from the water. Preferably the rear step 12 is separated from the underwater rudder 9 by 300 mm or more, but when the interval therebetween is small, a tunnel-shaped notch serving as a water-flow passageway is provided at a central portion of the rear step 12.

The rudder 13 forming vertical tail 7 is operated as linked to the underwater rudder 9, as described above. In the turning of the main body 1, the underwater rudder 9 is the principal steering mechanism while the craft remains on the water surface. But when the speed rises and the airflow behind the propeller becomes active, or when the main body lifts up off of the water surface, the draft becomes shallow and the steering effect of the underwater rudder 9 becomes weak, whereby the rudder 13 becomes the principal steering mechanism.

The stabilizer 14 forming a horizontal tail 8 is mounted horizontally at an upper portion of the vertical tail 7 and in front of elevator 15. In order to effectively utilize a rear airflow produced by the propeller 6 to create a PAR (Power Augmented Ramwing) effect with the horizontal tail 8, the height of the stabilizer 14 substantially coincides with the height of the center of the propeller 6. The interval between the front edge of the stabilizer 14 and the propeller 6 is preferably about 100 mm to facilitate the dismounting and maintenance of the propeller 6. If they are separated too far, the PAR effect becomes weak. The angle of attack of the stabilizer 14 is preset while observing a navigation condition so that stability can be established in the longitudinal direction.

Elevator 15 forming the horizontal tail 8 is constructed of left and right flaps, and is used as an aileron in the raising and lowering of the nose and in the turning of the main body 1. After longitudinal stabilization of the main body 1 has been adjusted by the stabilizer 14, if the flaps of elevator 15 are moved downwards, then the nose is forced down, while if they are moved upwards, then the nose is lifted up. If the flap of the elevator 15 on the right side is moved upwards and the flap on the left side is moved downwards, then an aileron operation would occur. If the former is moved downwards and the latter upwards on the left side, then likewise an aileron operation would occur. In order to compensate for a reaction torque of the propeller 6, the areas of the left and right flaps of the elevator 15 are made different, or the angles at which they are mounted under a balanced condition are offset.

The operator's seat 16 is movable by about 100 mm in back and forth directions, for the purpose of finely adjusting the position of a center of gravity and matching it with the operator's attitude.

The throttle lever 18 for controlling the engine is provided on the port side of the cockpit 4. The throttle lever 18 is connected to a valve in a carburetor via a push-pull wire (not shown). The degree of opening of the valve in the carburetor is adjusted by the throttle lever 18, and while monitoring the engine tachometer, the rotational speed of the engine is set at a predetermined value.

The stick lever 19 for controlling the elevator 15 is provided at the center of the operator's seat 16 in the cockpit 4. If the stick lever 19 is pulled towards the operator, an elevator-up operation is carried out in which the nose of the main body 1 is raised, while if the stick lever 19 is pushed forward, an elevator-down operation is carried out in which the nose is forced down. If the stick lever 19 is moved leftwards or rightwards, the elevator 15 will carry out aileron operations.

The pedal 20 for controlling the rudder 13 and the underwater rudder 9 is disposed in front of the operator's seat 16. The pedal 20 consists of respective pedals for the right foot and for the left foot connected with each other. When turning the craft to the left, if the right foot pedal is tread on, then the left foot pedal is moved towards the operator, and the rudder 13 and the underwater rudder 9 are jointly operated. When turning the craft to the right, if the left foot pedal is tread on, similar operations occur.

Reference numeral 21 designates side plate support rods for reinforcing the side plates 2. The side plate support rods 21 are provided so as to counteract the stress of the side plates 2 exerted by lateral wind and lateral waves or during turning. Preferably the side plate support rods 21 have a configuration for which air resistance becomes minimum.

Next, one example of a method of operation of the illustrated embodiment will be explained sequentially for the respective items, in the following.

(1) Before alighting on the water, the following items are confirmed:

1-1 It is confirmed that a thrust of the propeller 6 has a prescribed value.

1-2 It is confirmed that the center of gravity is proximate the front step 11. It is desirable that the center of gravity be 100-200 mm in front of the aerodynamic center.

1-3 It is confirmed that instruments in the respective operation systems can operate normally.

1-4 It is confirmed that the angle of attack of the main wing is a prescribed angle (for instance, 6 degrees).

1-5 It is confirmed that the angle of attack of the stabilizer 14 is a prescribed angle (for instance, 4 degrees).

(2) In an alighting test, the following items are confirmed:

2-1 It is confirmed that a trim angle (for instance, 3 degrees) of the main body 1 has a prescribed value. The seat 16 is moved back and forth, and fine adjustment is effected.

2-2 It is confirmed that the side plate floats 10 are not in contact with water.

2-3 It is confirmed that the rearmost portion of the main body 1 is spaced about 100 mm from the water surface.

2-4 An operator gets in the cockpit 4 and confirms that restoring forces are exerted at the front, rear, and left and right sides of the main body 1. It is confirmed that the end plate floats 10 are fully functioning.

(3) The engine is started, and at a low speed nearly equal to an idling speed, the following items are confirmed:

3-1 Lateral stability during straightly advancing navigation is confirmed.

3-2 A turning radius is confirmed. Right and left turns are carried out and the proper operations of the rudder 13 and the underwater rudder 9 are confirmed. Also, lateral stability is confirmed.

3-3 The proper operation of the elevator 15 during navigation is confirmed. Operations of the elevator 15 are effected, and the speed at which the nose can be raised and lowered is checked.

When fine adjustment has been finished through the aforementioned tests, it is desirable that while the position of the elevator 15 is maintained, the speed is successively increased to achieve take-off from the water.

During navigation on the water surface, the nose is raised by moving the elevator up, and a sufficient trim angle is selected, whereby take-off from the water can be made early. It is also possible that during gliding, the nose can be held down by moving the elevator down and the altitude of the craft above the water is maintained. If the speed is reduced from that maintaining the gliding condition, the main body 1 will alight on the water quietly and navigation can be made on the water surface. When the operation has been finished, the engine is stopped.

As described in detail above, according to the illustrated embodiment of the present invention, owing to the fact that side plates are provided at both the left and right sides of an airfoil-shaped main body and a flow of air from the sides thereof is prevented, there is an advantage in that during the banking of the airframe, the ground-surface-effect on the side tilted down is enhanced, and a restoring force is exerted on the side tilted up. Therefore, a problem of the side plate and the side plate float on the same side coming into contact with water will not arise.

In addition, there is an advantage in that since side plate floats are provided on the side plates, if the airframe should tilt due to, for example, rolling or the like, then the side plate float on the corresponding side would be deeply submerged in the water and a corresponding strong restoring force would be generated, and so, the tilt is immediately corrected and thus lateral stability is improved.

Since the present invention has the above-described structural features, it produces the following effects and exhibits the following advantages.

That is, as the main body floats up from the water surface by making use of the ground-surface-effect and thereafter begins to glide, and an underwater drag during gliding is not present but only an aerodynamic drag is present. Therefore, the craft can travel under a relatively small amount of power. In other words, as compared to the ground-surface-effect winged crafts in the prior art, the plane according to the present invention can reach ram wing gliding safely and quickly. In addition, upon turning, since the side plate or the like on the side tilted downwardly will not come into contact with the water, the turning and stability of the craft while gliding are facilitated, and a ground-surface-effect is employed to a high degree.

While a principle of the present invention has been described above in connection with one preferred embodiment of the invention, it is intended that all matter contained in the above description and illustrated in the accompanying drawings shall be interpreted to be illustrative and not as limitative of the scope of the invention.

What is claimed is:

1. A ground-surface-effect winged craft comprising: an airframe including a main body portion in the shape of an airfoil, a float portion defined at a central lower portion of said main body portion of the airframe and imparting buoyancy to the airframe when the craft rests on a body of water, an operator's seat located at a central upper portion of said main body portion above said float portion, side plates extending generally vertically at opposite lateral sides of said main body portion, respectively, the side plates inhibiting air from flowing laterally outwards from the underside of said main body portion, floats located at said side plates, a generally vertically extending tail portion located at the rear of said main body portion, and a generally horizontally extending tail portion located at the rear of said main body portion, said generally horizontally extending tail portion including a stabilizer and an elevator; and propelling means for producing an air flow that will both create a power augmented ramwing effect with said generally horizontally extending tail portion and a thrust on the airframe sufficient to generate a ground-surface-effect between said main body portion and a flat surface such as the surface on which the craft rests, said propelling means including a propeller rotatably supported on said airframe about an axis of rotation, said propeller located adjacent to said generally horizontally extending tail portion with said axis of rotation thereof extending substantially at the level at which said stabilizer is disposed so as to facilitate the production of said power augmented ramwing effect.

2. A ground-surface-effect winged craft as claimed in claim 1, wherein said generally vertically extending tail portion includes a generally vertically extending rudder, and further comprising an underwater rudder, said underwater rudder disposed on the craft so as to lie under the surface of a body of water on which the craft may rest and linked to said generally vertically extending rudder so as to move therewith.

3. A ground-surface-effect winged craft as claimed in claim 1, wherein said floats are disposed entirely above the waterline of the craft.

4. A ground-surface-effect winged craft as claimed in claim 1, wherein said float portion has a bottom surface having a stepped configuration in which a step is defined centrally of the float portion.

5. A ground-surface-effect winged craft as claimed in claim 4, wherein a step is also defined at the rear of said float portion by the bottom surface thereof.

6. A ground-surface-effect winged craft as claimed in claim 5, wherein said side plates have terminal bottom edges coinciding with or located slightly above a plane extending between respective edges forming the corners of said steps.

7. A ground-surface-effect winged craft as claimed in claim 1, wherein said airframe includes a cabin integral with said main body portion and said float portion, said operator's seat disposed within said cabin.

* * * * *